No. 892,083. PATENTED JUNE 30, 1908.
C. RAWLINSON.
COMBINED TRUCK AND SUPPORTING STAND.
APPLICATION FILED DEC. 21, 1907.
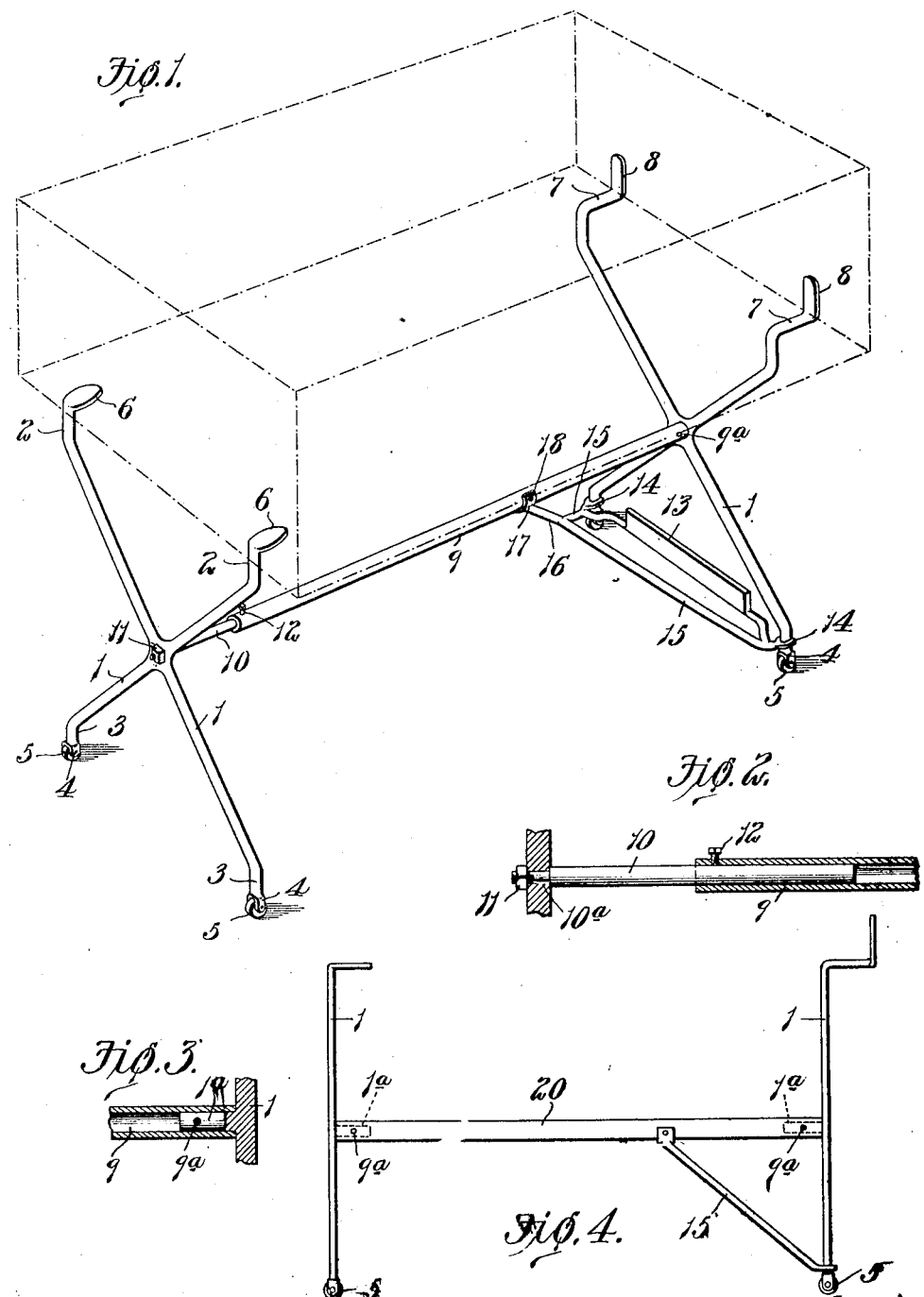
Witnesses:
George Ladson
Niels L. Church
Inventor:
Charles Rawlinson.
By Bakewell Cornwall Attys

UNITED STATES PATENT OFFICE.

CHARLES RAWLINSON, OF ST. LOUIS, MISSOURI.

COMBINED TRUCK AND SUPPORTING-STAND.

No. 892,083.  Specification of Letters Patent.  Patented June 30, 1908.

Application filed December 21, 1907. Serial No. 407,602.

To all whom it may concern:

Be it known that I, CHARLES RAWLINSON, a citizen of the United States, residing at St. Louis, Missouri, have invented a certain new and useful Improvement in a Combined Truck and Supporting-Stand, of which the following is a full, clear, and exact description, such as will enable others skilled in the art to which it appertains to make and use the same, reference being had to the accompanying drawings, forming part of this specification, in which—

Figure 1 is a perspective view of a combined trunk truck and supporting stand constructed in accordance with my invention; Fig. 2 is a detail sectional view illustrating the adjustable tie member; Fig. 3 is a detail sectional view illustrating the connection between the tie member and one of the end pieces of the truck; and Fig. 4 is a side elevation of a truck provided with a tie member of slightly different construction from that shown in Fig. 1.

This invention relates to trunk trucks and is an improvement upon the truck shown in my prior patent No. 854,381, dated May 21, 1907.

The object of my present invention is to provide a truck of the design shown in said patent which is strong and rigid and inexpensive to manufacture.

Referring to the drawings which illustrate the preferred form of my invention, 1 designates crossed members that form the X-shaped end pieces of the combined truck and supporting stand, each of said members being provided at its upper and lower ends with vertically disposed portions 2 and 3, respectively. The vertically disposed portions 3 at the lower ends of the members 1 are provided with integral jaws 4 in which rollers 5 are journaled, and the members 1 which form one end piece of the truck are provided with inwardly extending flat arms 6 that are formed integral with the upwardly projecting portions 2 of said members, said arms constituting a support for one end of the trunk. The members 1 which form the other X-shaped end piece of the truck are provided with integral outwardly projecting arms 7 which form a support for the other end of the trunk, and said arms have integral up-turned flat portions 8 that prevent the trunk from shifting longitudinally of the truck.

In the form of my invention shown in Fig. 1, one of the X-shaped end pieces of the truck is provided with an inwardly projecting boss or extension 1ª at the point where the members 1 cross, and the X-shaped end piece that forms the other end of the truck is provided with a hole or opening at the point where the members 1 of said end piece cross. The member that ties the two X-shaped end pieces together consists of a piece of pipe or tubing 9 that embraces the extension or boss 1ª and is secured thereto by a pin 9ª and a rod 10 arranged in the opposite end of said piece of tubing and provided with a reduced extension 10ª, as shown in Fig. 2, that extends through the hole in the other end piece of the truck and is secured thereto by means of a nut 11, the rod 10 and pipe 9 being adjustably connected together by a set screw 12.

The foot-piece 13 on which the operator rests his foot when placing a trunk on the truck, is provided with integral jaws 14 that embrace the vertical portions 3 of the members 1 which form one end of the truck, said foot-piece 13 being integrally connected to inclined braces 15 that merge into a single shank 16 which is provided with a jaw 17 that embraces the pipe or tubing 9 of the tie member and is secured thereto by means of a pin 18.

A truck of this description is strong and rigid and can be manufactured at a very low cost as the end pieces of the truck consist of one-piece castings. The foot-piece and inclined braces 15 also consist of a single casting and the tie member is secured to the end pieces in such a way that no machine work is required in assembling the parts of the truck together. Instead of using an adjustable tie member, as shown in Fig. 1, I can provide both end pieces of the truck with inwardly projecting bosses 1ª, as shown in Fig. 4, and use a single piece of pipe or tubing 20 for the tie member, the opposite ends of said pipe being secured to the bosses 1ª by pins or other suitable devices.

Having thus secured my invention, what I claim as new and desire to secure by Letters Patent is:

A truck of the character described, comprising cast metal X-shaped end pieces provided with integral inwardly projecting bosses, a tie member consisting of a piece of pipe or tubing which embraces the inwardly projecting bosses on said end pieces, means for securing said tubing to said bosses, a foot-piece provided with jaws for engaging one of the end pieces of the truck and integrally connected to inclined braces that merge into a single shank, a jaw on said shank which embraces the tie member, and a pin passing through said jaw and tie member for permanently connecting said parts together; substantially as described.

In testimony whereof I hereunto affix my signature in the presence of two witnesses, this eighteenth day of December 1907.

CHARLES RAWLINSON.

Witnesses:
WELLS L. CHURCH,
GEORGE BAKEWELL.